Feb. 14, 1967   A. E. B. BRITT   3,303,799
ROW SHAPER
Filed Oct. 15, 1964   2 Sheets-Sheet 1

INVENTOR
AMOS EDWARD BOYER BRITT

BY *Cushman, Darby & Cushman*
ATTORNEYS

United States Patent Office 3,303,799
Patented Feb. 14, 1967

3,303,799
ROW SHAPER
Amos Edward Boyer Britt, Rte. 2,
Indianola, Miss. 38751
Filed Oct. 15, 1964, Ser. No. 404,090
3 Claims. (Cl. 111—6)

This invention relates to a device for agricultural purposes and more particularly to a device and a method for the application of agricultural chemicals to the soil and especially to a shaped seed bed.

Heretofore a number of methods and devices have been utilized to apply agricultural chemicals, such as herbicides, to the soil. Generally, these included dusting and spraying manually or mechanically as by airplanes, tractors or other agricultural implements. Usually, however, these methods often prevented the selective application of the agricultural chemical to the soil thereby unnecessarily and disadvantageously causing direct contact of the chemical with the vegetation or the proximate area surrounding the planted seed in a shaped seed bed. These conventional methods thus seriously retarded or killed growing vegetation. Further, in instances where the chemical produced no serious effects on the vegetation, often harmful effects were produced on the consumers of such vegetation since the complete removal was not always feasibly or properly accomplished.

It is therefore a principal object of the instant invention to overcome the disadvantages of prior art methods and devices for the application of agricultural chemicals to soil without substantially contacting directly vegetation in any state of growth with said chemicals.

It is another object of this invention to provide a novel method and apparatus for applying agricultural chemicals to a prepared seed bed.

Yet another object of the instant invention is to provide a device which can simultaneously prepare a seed bed from a furrow and apply an agricultural chemical thereto without substantially introducing said chemical to that portion of the seed bed into which seeds are introduced.

A further object of the instant invention is to provide a novel device for the application of agricultural chemicals to soil which is simple in construction, durable and efficient for the purposes intended.

These and various other objects, advantages and adaptations of the invention will become more apparent from the following description of certain exemplary modes of procedure. In order to illustrate and facilitate understanding of the invention, reference will be had to the appended drawings in which.

Figure 1:
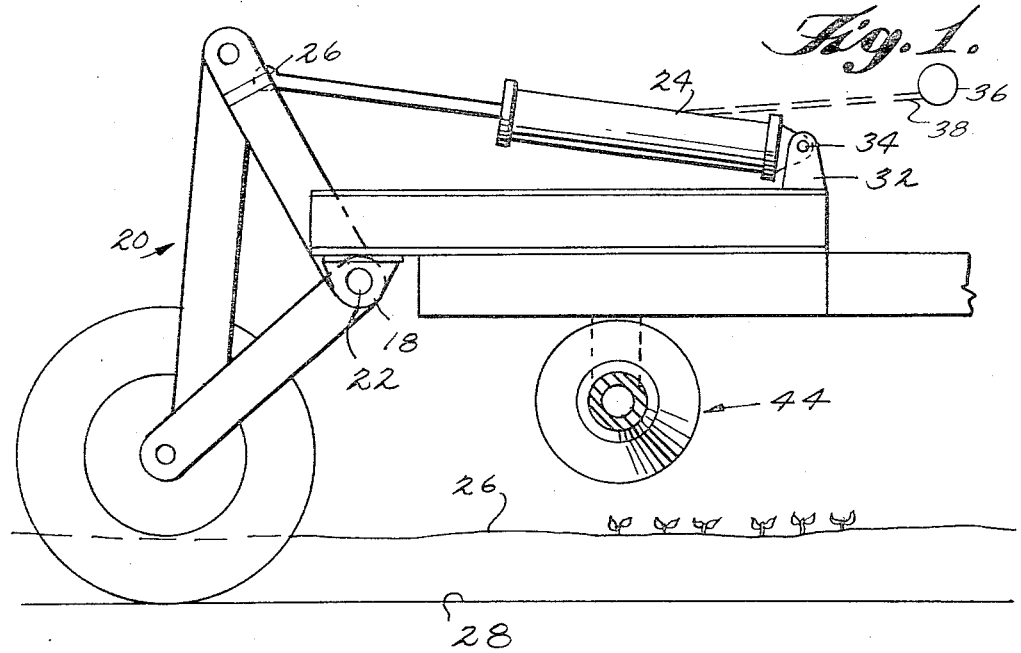
FIGURE 1 is a fragmentary side elevation taken along the line 1—1 of FIGURE 3 of the agricultural chemical applicator device of this invention with the applicator roller held in raised position.
Figure 2:
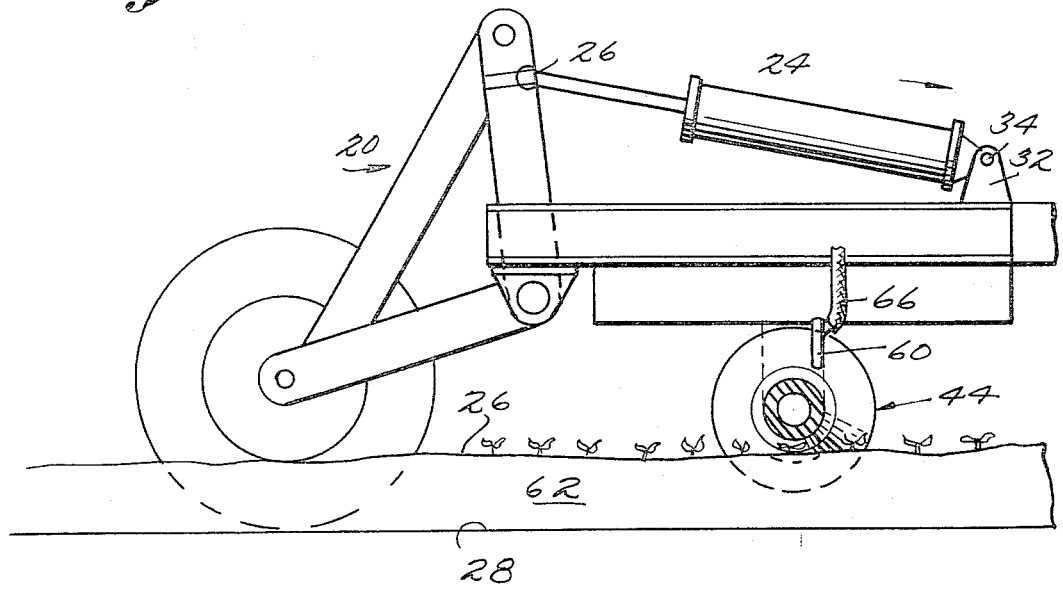
FIGURE 2 is a view similar to FIGURE 1, but shows the frame lowered so that the applicator roller contacts the formed seed bed without injury to the vegetation.
Figure 3:
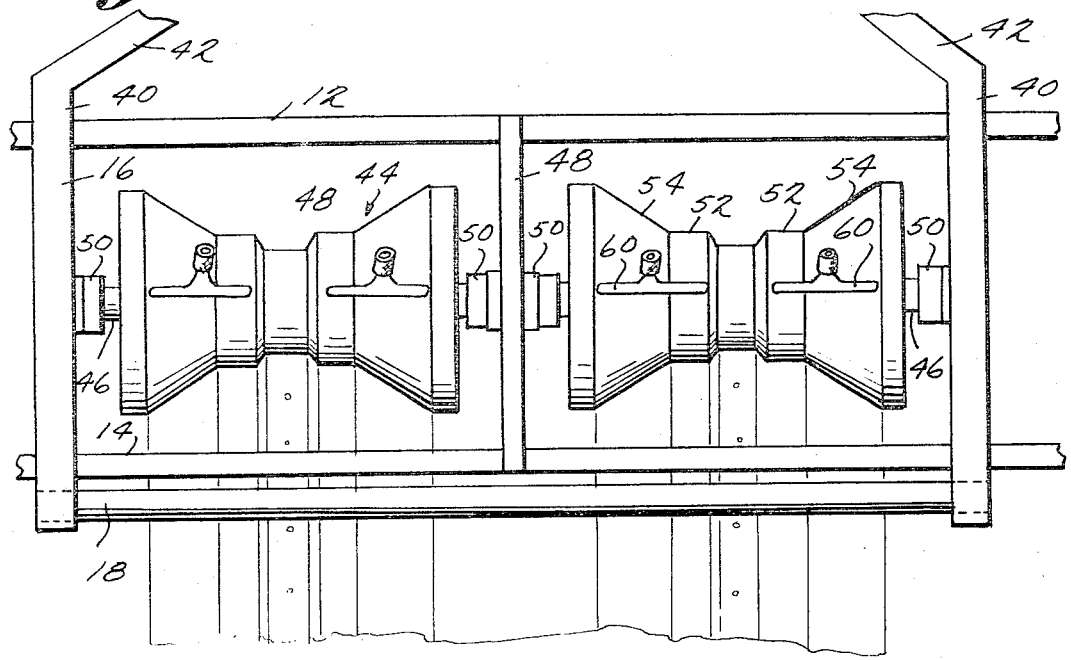
FIGURE 3 is a fragmentary plan view of the agricultural device of this invention.

Referring now to the drawings, wherein like numerals refer to like parts, 10 represents a main frame which is preferably rectangular in shape, and formed of front and rear channel-irons 12 and 14, respectively, to which are secured intermediate the transverse members (not shown), transverse bars 16, Fixedly attached to transverse bars 16 and extending normal thereto is shaft 18 which carries a pair of rear wheels supporting carriages 20. The carriages 20 are pivoted to the rear channel 14 at 22 by a pair of hydraulic rams 24 each pivotally connected at 26. Reference to FIGURES 1 and 2 illustrate how the hydraulic rams 24 when extended will swing the carriages 20 about their pivots 18 for moving downwardly and lifting the frame 10 with respect to the crest 26 of the shaped seed bed and the ground line 28. During the extension of the hydraulic ram 24, the carriages 20 are swung about their pivots in a counterclockwise direction. The forward ends 30 of the hydraulic rams 24 are secured to the transverse bars 16 by lugs 32 and pins 34.

A tank is indicated diagrammatically at 36. This tank carries a fluid under the desired pressure. The line 38 leads from the tank 36 to the hydraulic rams 24. The tank 36 is preferably carried by the pulling vehicle (not shown) and the operation of the vehicle is provided with the usual control mechanism (also not shown) for controlling the operation of the hydraulic ram 24. Thus it is possible for the operator to feed fluid from the tank 36 to and from the hydraulic ram 24 for extending the ram, as shown in FIGURE 1, for lifting the frame upwardly or for shortening the ram so as to permit the applicator rollers to engage the formed seed bed and/or furrow.

To the forward ends 40 of the transverse bars 16 are secured to a pair of angularly inwardly disposed channel irons 42 which at their free ends (not shown) can be provided with means such as a clevis plate and bolts (not shown) for attachment to a pulling vehicle such as a tractor (also not shown).

Figure 4:
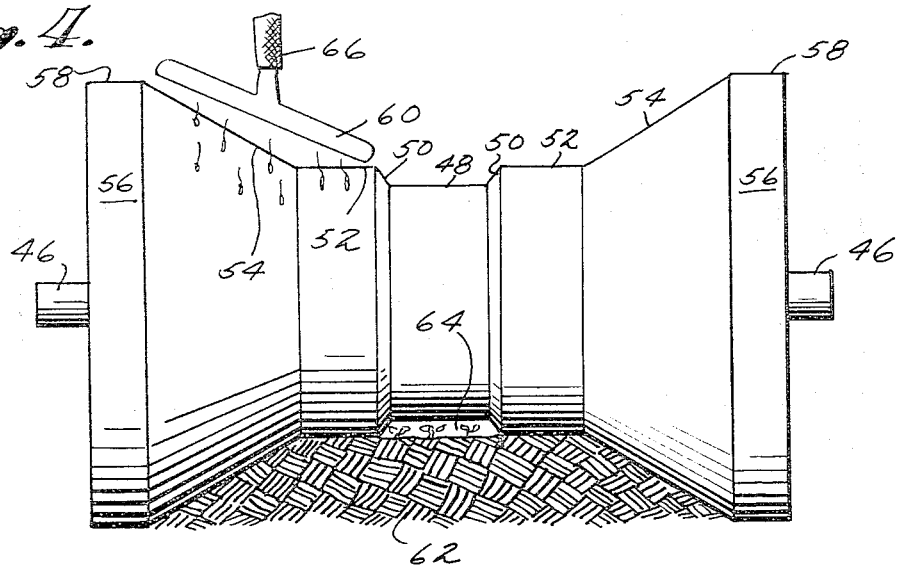
FIGURE 4 is an enlarged view of the applicator roller.

The applicator rollers 44 are of identical construction and therefore a description of one will suffice. The applicator roller is rotatably mounted on longitudinally extending shaft 46. The transverse bars 16 as well as centrally disposed transverse bar 48 carry bearings 50 through which shaft 46 is passed. In FIGURE 4 two applicator rollers 44 are shown mounted on the shaft 46, although it should be recognized by those skilled in the art that any convenient number of rows of such rollers can be employed.

Each of the applicator rollers 44 is spool shaped and is composed of a centrally disposed cylindrical member 48, the ends of which merge into outwardly flaring wall 50 which in turn merge into cylindrical members 52. Cylindrical members 52 merge into conical shaped ends 54 which can carry steel bands 56 around the periphery of their cylindrical outer ends 58.

Vertically disposed above the cylindrical members 52 and the conical shaped ends 54 are means such as a nozzle 60 leading from a source (not shown) of an agricultural chemical for dispensing said chemical to the peripheral surfaces thereof. Any other convenient dispensing means such as an oiler shoe or the like can be used.

In operation the hydraulic ram 24 is contracted to pivot the carriage 20, thus lowering the frame 10 and the applicator rollers 44 a predetermined distance such that the cylindrical members 52 and the conical shaped ends 54 come into contact with the shaped seed bed 62, as illustrated in FIGURE 4. It can be seen that the centrally disposed cylindrical member 48 has a diameter sufficiently small to provide an annular recess 64 of sufficient height so that the applicator roller will not damage the vegetation, but will at the same time be in contact with the adjacent soil of the shaped seed bed. Thus on dispensing an agricultural chemical, for instance a herbicide in liquid form, through the dispensing means 66, the peripheral surfaces of the cylindrical members 52 and the conical shaped ends 54 are wetted therewith and the chemical is selectively introduced into the seed bed 62 without coming into substantial contact with the vegetation. It can be also seen that in this process the seed bed can simultaneously be reshaped and because of the tapered walls 50, soil is prevented from being packed into the recess 64. Further, this process also provides for shaping of a seed bed such as 62 from a furrow and simultaneous application of an agricultural chemical such as a premerge composition.

It will also be recognized that the applicator roller 44 can be mounted on the frame 10 and attached to a vehicle in a manner to precede the vehicle or it can be mounted on the vehicle itself.

I claim:
1. A device for applying an agricultural chemical to soil comprising a rectangular shaped frame having front, rear and side members, a pivotal carriage attached to said frame and means operatively connected to said carriage and said frame for raising and lowering said frame, an applicator roller carried by the frame between the front and rear members thereof and being rotatable about an axis paralleling said front and rear members, said applicator roller comprising a centrally disposed cylindrical member merging into outwardly flaring walls, each of said walls merging into an outer cylindrical member, each of said outer cylindrical members merging into a conical shaped member, said centrally disposed cylindrical member providing an annular recess whereby the passage of the applicator roller over the soil permits contact of the applicator roller with the soil without substantial injury to vegetation growing therein.

2. A device for applying an agricultural chemical to soil comprising a rectangular shaped frame having front, rear and side members, a pivotal carriage attached to said frame and means operatively connected to said carriage and said frame for raising and lowering said frame, an applicator roller carried by the frame between the front and rear members thereof and being rotatable about an axis parallel to said front and rear members, said applicator roller comprising a centrally disposed cylindrical member merging into outwardly flaring walls, each of said walls merging into an outer cylindrical member, each of said outer cylindrical members merging into a conical shaped member, means for dispensing said chemical to the peripheral surface of said outer cylindrical members and said conical members whereby passage of the applicator roller over the soil permits application of the chemical to the soil without substantial contact thereof with vegetation growing therein.

3. In a device for applying a chemical to soil said device having means for dispensing said chemical on the peripheral surface of an applicator roller, the improvement which comprises an applicator roller comprising a centrally disposed cylindrical member merging into outwardly flaring walls, each of said walls merging into an outer cylindrical member, each of said outer cylindrical members merging into a conical shaped member whereby passage of said applicator roller over the soil permits application of the chemical to the soil without substantial contact thereof with vegetation growing therein.

References Cited by the Examiner
UNITED STATES PATENTS

| | | | |
|---|---|---|---|
| 827,587 | 7/1906 | Warner | 172—538 |
| 1,190,132 | 7/1916 | Dunham | 94—50 |
| 3,139,943 | 7/1964 | Evans et al. | |
| 3,152,353 | 10/1964 | Cravener | 47—1.5 X |

ABRAHAM G. STONE, *Primary Examiner.*

ROBERT E. BAGWILL, *Examiner.*